UNITED STATES PATENT OFFICE.

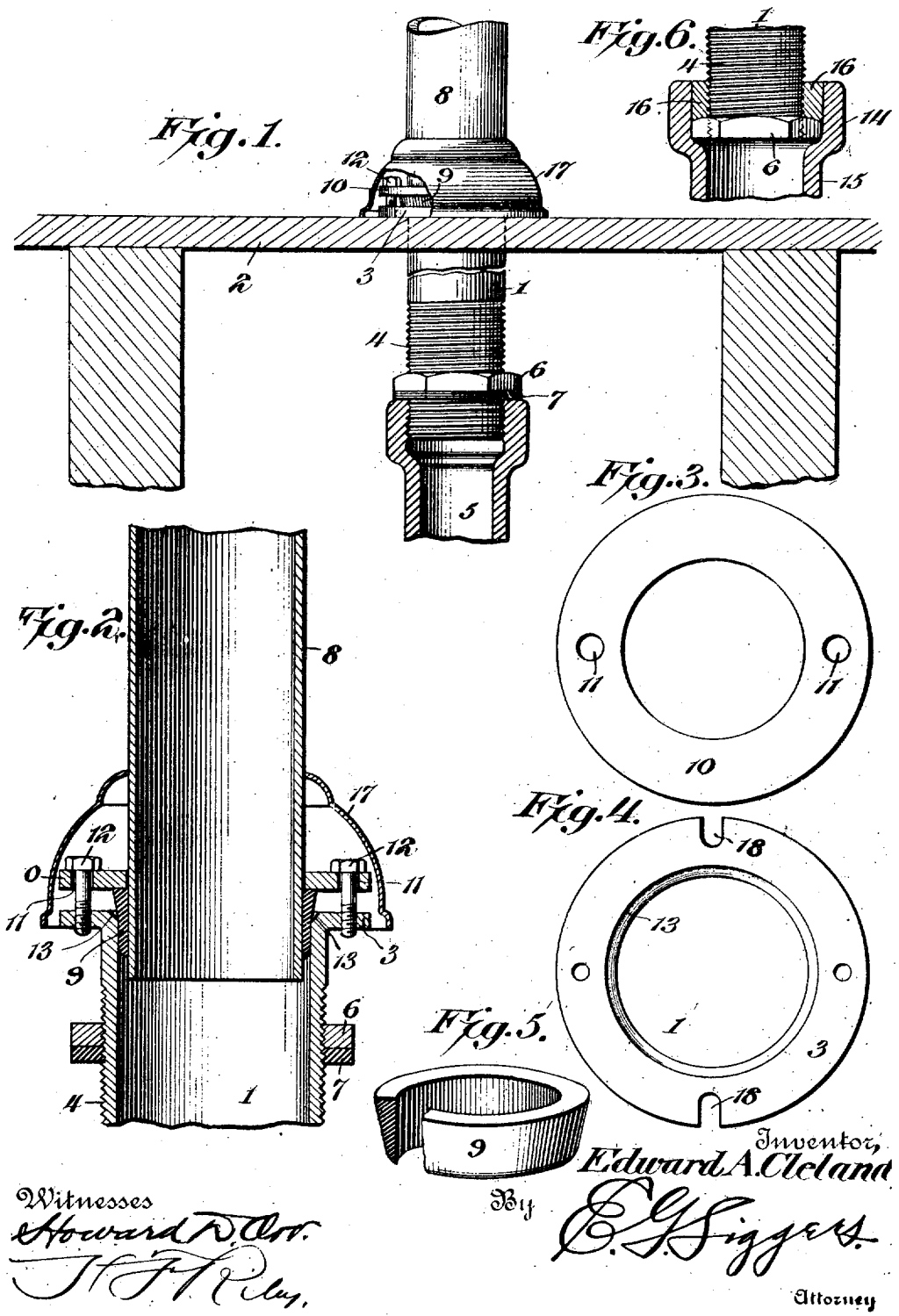

EDWARD A. CLELAND, OF LYNCHBURG, VIRGINIA.

PIPE-COUPLING.

No. 893,785.    Specification of Letters Patent.    Patented July 21, 1908.

Application filed April 19, 1906. Serial No. 312,596.

*To all whom it may concern:*

Be it known that I, EDWARD A. CLELAND, a citizen of the United States, residing at Lynchburg, in the county of Campbell and State of Virginia, have invented a new and useful Pipe-Coupling, of which the following is a specification.

The invention relates to improvements in pipe couplings.

The object of the present invention is to improve the construction of pipe couplings, and to provide a simple and comparatively inexpensive pipe coupling adapted to afford a safe, easy, adjustable connection between a waste pipe or vent and a basin or other plumbing fixture.

A further object of the invention is to provide a pipe coupling of this character designed to be located at the floor or wall, and capable of vertical adjustment below the floor to accommodate the coupling to the position of a vent or waste pipe section, and capable of both vertical adjustment and lateral oscillation above the floor to avoid cutting the upper pipe section or member, and to enable the same to be arranged at a slight inclination when necessary.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation partly in section of a pipe coupling constructed in accordance with this invention. Fig. 2 is an enlarged vertical longitudinal sectional view of the pipe coupling. Fig. 3 is a detail view of the adjustable collar. Fig. 4 is a plan view of the upper end of the adjustable lower section or member. Fig. 5 is a detail perspective view of the tapering gasket. Fig. 6 is a detail sectional view showing the lower end of the lower section or member calked in a vent or waste pipe.

Like numerals of reference designate corresponding parts throughout the several figures of the drawing.

1 designates a lower pipe section or member, which is designed to extend through an opening of a wall or floor 2, and which is provided at its upper end with an annular flange 3 adapted to rest upon the floor 2, as clearly shown in Fig. 1 of the drawing. The lower section or member 1, which may be of any desired length, is provided at its lower portion with exterior threads 4 and is adapted to screw into the upper end of a vent or waste pipe 5. By screwing the section or member 1 into the upper interiorly threaded end of the pipe 5, the section 1 may be adjusted to accommodate the coupling to the distance between the floor 2 and the pipe 5, so that a proper connection between the pipes 1 and 5 will be made and the flange 3 permitted to rest upon the floor 2. The lower section 1 is also provided with a lock nut 6, and a washer 7 is introduced between the lock nut and the upper end of the pipe 5. By this construction a perfectly tight joint is effected between the pipes 1 and 5.

The upper end of the lower section 1 is adapted to receive an upper pipe section or member 8, which is of less diameter than the lower section or member 1, and which is adapted to telescope into the same to obviate the necessity of cutting off the lower end of the pipe 8. The lower end of the upper section or member is arranged in spaced relation with the inner face of the lower section or member 1, in order to enable it to be oscillated laterally for arranging it at an inclination when desired. The lower end of the upper section or member 8 receives an exteriorly tapered gasket 9, which is interposed between the sections or members 1 and 8, as clearly illustrated in Fig. 2 of the drawing.

The tapered gasket, which is preferably constructed of rubber, and which has a uniform interior diameter may be of any other elastic or pliable material such as leather, soft metal, or the like, and its lower portion is tightly compressed between the interfitting portions of the sections 1 and 8. The tapered gasket, which is adapted to readily adjust itself to the position of the upper and lower sections or members of the coupling, forms a partial ball and socket joint, and enables the sections or members to be arranged at a slight angle to each other to afford the necessary lateral adjustment without bending the sections or members.

The upper edge of the tapered gasket is engaged by an adjustable collar 10, consisting of a flat ring having an opening of a diameter to fit the pipe 8, and provided with perforations 11 for the reception of screws 12, or other suitable fastening devices for adjustably connecting the collar 10 with the flange 3 of the lower section. Two diametrically opposite bolts or screws 12 are sufficient, but the number may be increased, should it be desired to provide a pipe coupling, which will stand considerable pressure. The bolt openings 11 are of greater diameter than the bolts or screws to admit of the lateral adjustment of the upper section or member, and if desired, the upper end of the lower section or member may be interiorly beveled, as shown at 13, to increase the ball and socket effect. By beveling the interior of the lower section or member 1, as shown, the upper section or member may be tilted or inclined even when inserted to a considerable extent into the lower section or member.

The coupling will be effective when arranged either vertically, or at a slight inclination to afford a drainage, and the lower end of the lower section or member 1 may be calked in the upper enlarged or hub portion 14 of a pipe 15, as illustrated in Fig. 6 of the drawing. When used in this manner, the lock nut 6 will afford a convenient support for the lead 16, and will prevent the same from leaking into the pipe 15.

The upper portion of the coupling is concealed within an escutcheon 17 of the ordinary construction. The escutcheon may be either in one piece, or be constructed in sections to enable it to be fitted around the coupling after the pipes have been connected.

The horizontal flange 3 of the lower section or member 1 is provided at opposite sides with recesses 18, adapted to be engaged by bolts to enable a cap to be secured to the upper end of the section 1 for closing the latter when testing the plumbing.

It will be seen that the pipe coupling is exceedingly simple in construction and that it will afford a safe, easy and adjustable connection between a waste or vent pipe and various plumbing fixtures, and that it is adjustable both above and below a floor and will obviate the necessity of bending the pipes to arrange the sections in angular relation. Also it will be clear that the coupling obviates the necessity of cutting off, or trimming the end of the upper section or member, as the latter may be introduced into the lower section or member to any desired extent. The tapered gasket is adjustable on the smaller section or member of the coupling, and when constructed of rubber, will form a tight joint or connection even when imperfectly fitted on the smaller section, and when the parts of the coupling are connected, the pressure will tend to force the gasket into proper position, should it be imperfectly fitted on the smaller section or member.

Having thus fully described my invention, what I claim as new and desire to secure by Letters Patent, is:—

1. In a coupling, the combination of upper and lower pipe sections or members of different diameters, the upper pipe section or member being adapted to telescope into the lower pipe section and being spaced therefrom, a tapered annular compressible gasket fitted on the upper pipe section or member and movable to different positions along the latter and interposed between the same and the lower pipe section or member and forming a partial ball and socket joint to permit the upper pipe section or member to be arranged either in a vertical or an inclined position, and adjustable means connected with the lower pipe section or member and engaging the gasket at the upper edge thereof and adapted to compress the same to form a tight joint in any adjustment of the upper section or member.

2. In a coupling, the combination of two pipe sections or members of different diameters, the smaller pipe section or member being adapted to telescope into the other and being spaced therefrom and the larger pipe section or member being provided with an exterior flange having threaded openings, a tapered annular compressible gasket fitted on the smaller pipe section or member and movable to different positions along the latter and interposed between the same and the larger pipe section or member and forming a partial ball and socket joint to permit the pipe sections or members to be arranged in angular relation, a slidable collar arranged on the smaller pipe section or member and engaging the gasket to compress the same and provided with openings, and spaced bolts engaging the threaded openings of the flange of the larger pipe section or member and passing through the openings of the collar, the latter being loose on the smaller pipe section or member and its openings loosely receiving the bolts, whereby the bolts are adapted to compress the gasket in any adjustment of the smaller pipe section.

In testimony, that I claim the foregoing as my own, I have hereto affixed my signature in the presence of two witnesses.

EDWARD A. CLELAND.

Witnesses:
JOHN H. SIGGERS,
E. G. SIGGERS.